United States Patent
Chiu et al.

(10) Patent No.: US 11,791,112 B2
(45) Date of Patent: *Oct. 17, 2023

(54) BACKLIGHT MODULE AND LUMINOUS KEYBOARD USING THE SAME

(71) Applicants: LITE-ON ELECTRONICS (GUANGZHOU) LIMITED, Guangzhou (CN); Lite-On Technology Corporation, Taipei (TW)

(72) Inventors: Shih-Wen Chiu, Taipei (TW); Yi-Wen Chen, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/974,551

(22) Filed: Oct. 27, 2022

(65) Prior Publication Data
US 2023/0038301 A1 Feb. 9, 2023

Related U.S. Application Data

(63) Continuation of application No. 16/878,614, filed on May 20, 2020, now Pat. No. 11,515,108.

(Continued)

(30) Foreign Application Priority Data

Apr. 29, 2020 (CN) .......................... 202010355363.2

(51) Int. Cl.
*H01H 13/84* (2006.01)
*H01H 3/12* (2006.01)
(Continued)

(52) U.S. Cl.
CPC ........... *H01H 13/84* (2013.01); *G02B 6/0028* (2013.01); *G02B 6/0055* (2013.01); *H01H 3/125* (2013.01);
(Continued)

(58) Field of Classification Search
CPC .......... H01H 13/84; H01H 13/83; H01H 3/12; H01H 13/023; H01H 13/705;
(Continued)

(56) References Cited

U.S. PATENT DOCUMENTS 11,515,108 B2 * 11/2022 Chiu .................... G02B 6/0055
2016/0093452 A1 * 3/2016 Zercoe ................ H01H 13/023
200/314

* cited by examiner

*Primary Examiner* — Lheiren Mae A Caroc
*Assistant Examiner* — Iman Malakooti
(74) *Attorney, Agent, or Firm* — JCIPRNET

(57) ABSTRACT

A backlight module including a light guide plate, a circuit board, an electronic component, a reflective sheet, a light-shielding sheet, and a light-emitting component is provided. The light guide plate includes an escape opening and a light-source opening. The circuit board is disposed under the light guide plate. The electronic component is electrically connected to the circuit board, and at least a part of the electronic component is located in the escape opening. The reflective sheet is disposed on a rear surface of the light guide plate and between the light guide plate and the circuit board. The light-shielding sheet is disposed on a light emitting surface of the light guide plate opposite to the rear surface. The light-emitting component is disposed in the light-source opening. A luminous keyboard using this backlight module is also provided.

20 Claims, 7 Drawing Sheets

Related U.S. Application Data

(60) Provisional application No. 62/849,961, filed on May 20, 2019.

(51) Int. Cl.
*F21V 8/00* (2006.01)
*H01H 13/83* (2006.01)
*H01H 13/705* (2006.01)

(52) U.S. Cl.
CPC ............ *H01H 13/83* (2013.01); *H01H 13/705* (2013.01); *H01H 2219/044* (2013.01); *H01H 2219/06* (2013.01); *H01H 2219/0621* (2013.01); *H01H 2239/004* (2013.01)

(58) Field of Classification Search
CPC ....... H01H 2219/014; H01H 2219/036; H01H 2219/06; G02B 6/0028; G02B 6/0055; F21V 8/00
USPC .......................... 200/5 A, 314, 310–313, 317
See application file for complete search history.

BACKLIGHT MODULE AND LUMINOUS KEYBOARD USING THE SAME

CROSS-REFERENCE TO RELATED APPLICATION

This application is a continuation application of and claims the priority benefit of U.S. application Ser. No. 16/878,614, filed on May 20, 2020. The prior application Ser. No. 16/878,614 claims the priority benefits of U.S. provisional application Ser. No. 62/849,961, filed on May 20, 2019, and China application serial no. 202010355363.2, filed on Apr. 29, 2020. The entirety of each of the above-mentioned patent applications is hereby incorporated by reference herein and made a part of this specification.

BACKGROUND

Technical Field

The present disclosure generally relates to a backlight module and a luminous keyboard. More particularly, the present disclosure relates to a backlight module and a luminous keyboard with embedded electronic components.

Description of Related Art

With the development of today's lighting technology, various electronic products with luminous functions have emerged in order to provide users with more favorable user experience. For example, a keyboard used as a main input device of a desktop computer or a laptop computer is currently a very popular luminous electronic product. Conventional keyboards did not have luminous functions. Later, in order to achieve lighting prompter and decorative effects, manufacturers adopt lighting structures as light sources to light up keys individually when activated.

On the other hand, according to market demand, electronic products have gradually developed towards a thinner and lighter trend in recent years. The keyboard products have developed toward the same trend, especially the keyboard used in a notebook (laptop) computer. The thickness of the keyboard has significant impact on the overall thickness of the notebook computer. Therefore, how to effectively reduce the thickness of the keyboard is an issue that related manufacturers are committed to resolve and improve. A part from reducing the thickness of the keyboard, how to reduce production cost is also an important development issue.

SUMMARY

The present disclosure is directed to a backlight module and a luminous keyboard, wherein an electronic component is arranged in the light guide plate to reduce the thickness of the backlight module and the luminous keyboard using the same.

The present disclosure provides a backlight module including a light guide plate, a circuit board, an electronic component, a reflective sheet, a light-shielding sheet, and a light-emitting component. The light guide plate includes an escape opening. The circuit board is disposed under the light guide plate. The electronic component is disposed on the circuit board, and at least a part of the electronic component is located in the escape opening. The reflective sheet is disposed on a rear surface of the light guide plate and between the light guide plate and the circuit board, and the reflective sheet extends into the escape opening. The light-shielding sheet is disposed on the light-emitting surface of the light guide plate opposite to the rear surface. The light-emitting component is disposed at the light guide plate.

According to an embodiment of the present disclosure, the light-emitting component is disposed on the circuit board and adjacent to a side surface of the light guide plate, the electronic component is different from the light-emitting component, and a height of the electronic component is substantially greater than a height of the light-emitting component.

According to an embodiment of the present disclosure, the light-emitting component is disposed on the reflective sheet or the light-shielding sheet and adjacent to a side surface of the light guide plate.

According to an embodiment of the present disclosure, the reflective sheet is connected to the light-shielding sheet at a portion corresponding to an upper surface of the electronic component.

According to an embodiment of the present disclosure, the circuit board includes a bonding portion disposed on the rear surface of the light guide plate and a component portion corresponding to the escape opening, and the component portion coupled to the electronic component protrudes from the bonding portion in a direction away from the light guide plate.

According to an embodiment of the present disclosure, the circuit board includes a bonding portion disposed on the rear surface of the light guide plate and a component portion corresponding to the escape opening, the component portion coupled to the electronic component is coplanar with the bonding portion, and the electronic component is disposed on the component portion.

The present disclosure provides a luminous keyboard including a light guide plate, a circuit board, an electronic component, a reflective sheet, a light-emitting component, a base plate, and a key switch structure. The light guide plate includes an escape opening. The circuit board is disposed under the light guide plate. The electronic component is disposed on the circuit board, and at least a part of the electronic component is located in the escape opening. The reflective sheet is disposed on a rear surface of the light guide plate and in the escape opening. The light-emitting component is disposed at the light guide plate. The base plate is disposed on the light guide plate. The key switch structure is disposed on the base plate.

According to an embodiment of the present disclosure, the reflective sheet extends upward into the escape opening and comprises a cover portion covering an upper surface of the electronic component.

According to an embodiment of the present disclosure, the reflective sheet extends upward into the escape opening and comprises a reflective sheet opening exposing the electronic component.

According to an embodiment of the present disclosure, the luminous keyboard further includes a light-shielding sheet disposed on a light-emitting surface of the light guide plate opposite to the rear surface, wherein the light-shielding sheet covers the electronic component.

According to an embodiment of the present disclosure, the luminous keyboard further includes a light-shielding sheet disposed on a light-emitting surface of the light guide plate opposite to the rear surface, wherein the light-shielding sheet comprises a light-shielding sheet opening exposing the electronic component.

According to an embodiment of the present disclosure, the base plate comprises a base plate opening or a protruding portion corresponding to the electronic component, and the protruding portion protruding away from the circuit board.

According to an embodiment of the present disclosure, the key switch structure comprises a functional layer disposed on the base plate and a keycap disposed on the functional layer, and the functional layer comprises a functional layer opening corresponding to base plate opening or a protruding portion.

According to an embodiment of the present disclosure, at least a part of the electronic component is located in the base plate opening or the protruding portion.

According to an embodiment of the present disclosure, the key switch structure comprises a plurality of restoring components disposed on the base plate and a plurality of keycaps respectively disposed on the plurality of restoring components, and the electronic component is located between adjacent two of the plurality of keycaps, and a height of the electronic component is substantially greater than a height of the light-emitting component.

According to an embodiment of the present disclosure, an outermost surface of the luminous keyboard has an identifier.

The present disclosure provides a luminous keyboard including a key switch structure, a light guide plate, a reflective sheet, a circuit board, an electronic component, and a light-emitting component. The light guide plate is disposed under the key switch structure and including an escape opening. The reflective sheet is disposed under the light guide plate. The circuit board is disposed under the reflective sheet. The electronic component is coupled to the circuit board, and at least a part of the electronic component being located in the escape opening. The light-emitting component is coupled to the circuit board and disposed on a surface of the light guide plate, wherein the light-emitting component and the electronic component are of different heights.

According to an embodiment of the present disclosure, the luminous keyboard further includes a light-shielding sheet and an adhesive layer. The light-shielding sheet is disposed between the key switch structure and the light guide plate, wherein the light-shielding sheet covers the electronic component. The adhesive layer is disposed between the reflective sheet and the circuit board, wherein a thickness of the adhesive layer is less than a thickness of the light guide plate, and the thickness of the light guide plate is less than a height of the light-emitting component.

Based on the above, the light guide plate of the backlight module of this embodiment has an escape opening, and the reflective sheet extends upward from the rear surface of the light guide plate into the escape opening. Under such a configuration, at least a part of the electronic components can be embedded in the escape opening of the light guide plate, so that the thickness of the luminous keyboard using the backlight module can be effectively reduced. In addition, the reflective sheet of this embodiment extends upward from the rear surface of the light guide plate to cover the inner wall of the escape opening, thus effectively preventing the light emitted by the light-emitting component from leaking out of the escape opening.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
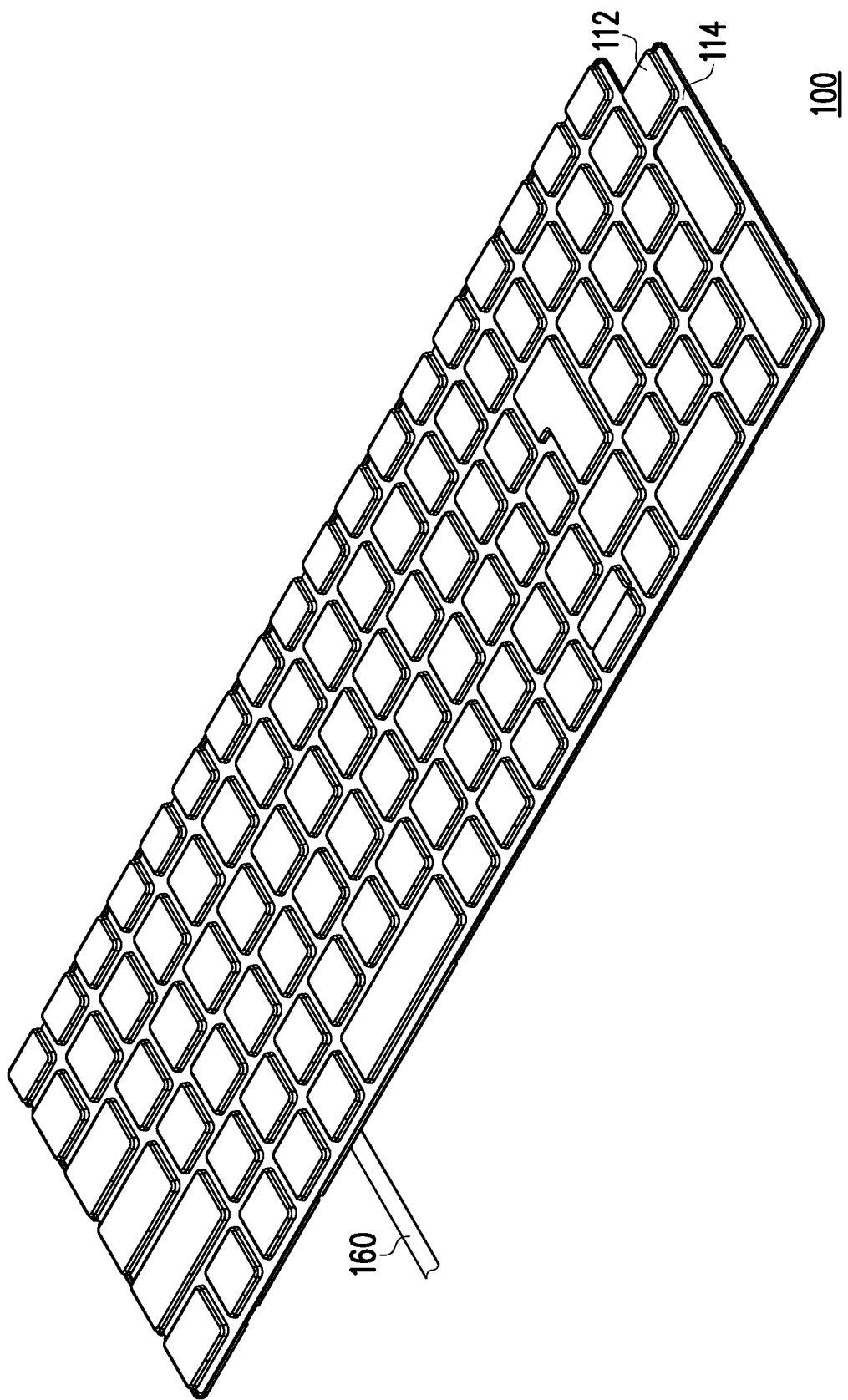
FIG. 1 is a schematic top view of a luminous keyboard according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The foregoing and other technical contents, features and effects of the present disclosure will be clearly presented in the following detailed description of the embodiments with reference to the drawings. Directional terms mentioned in the following embodiments, for example: "upper," "lower," "front," "rear," "left," "right," etc., are only directions referring to additional drawings. Therefore, the directional terms used are for illustration, not for limiting the present disclosure. Moreover, in the following embodiments, the same or similar components will be given the same or similar reference numbers.

Figure 2:
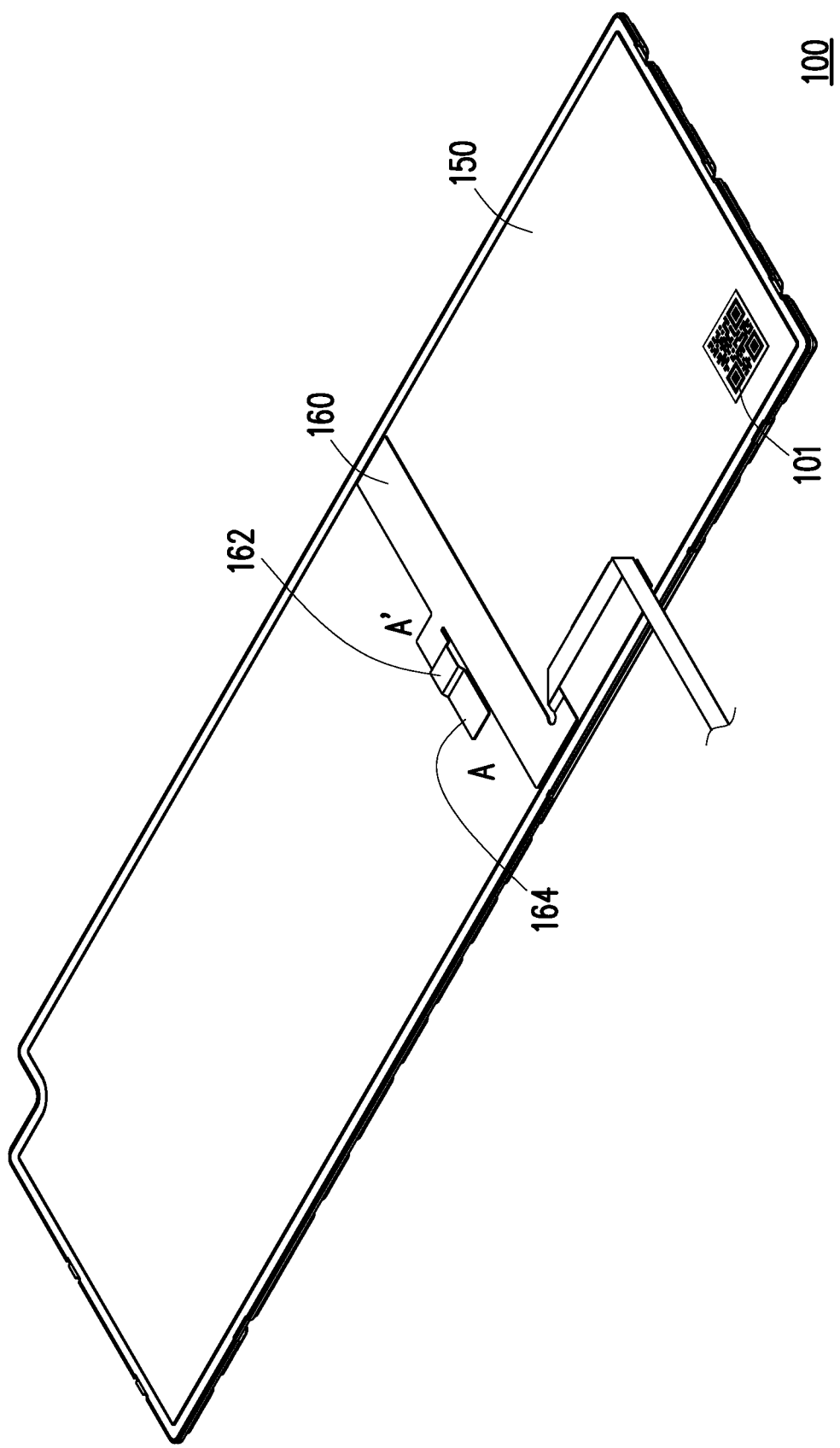
FIG. 2 is a schematic bottom view of a luminous keyboard according to an embodiment of the present disclosure.
Figure 3:
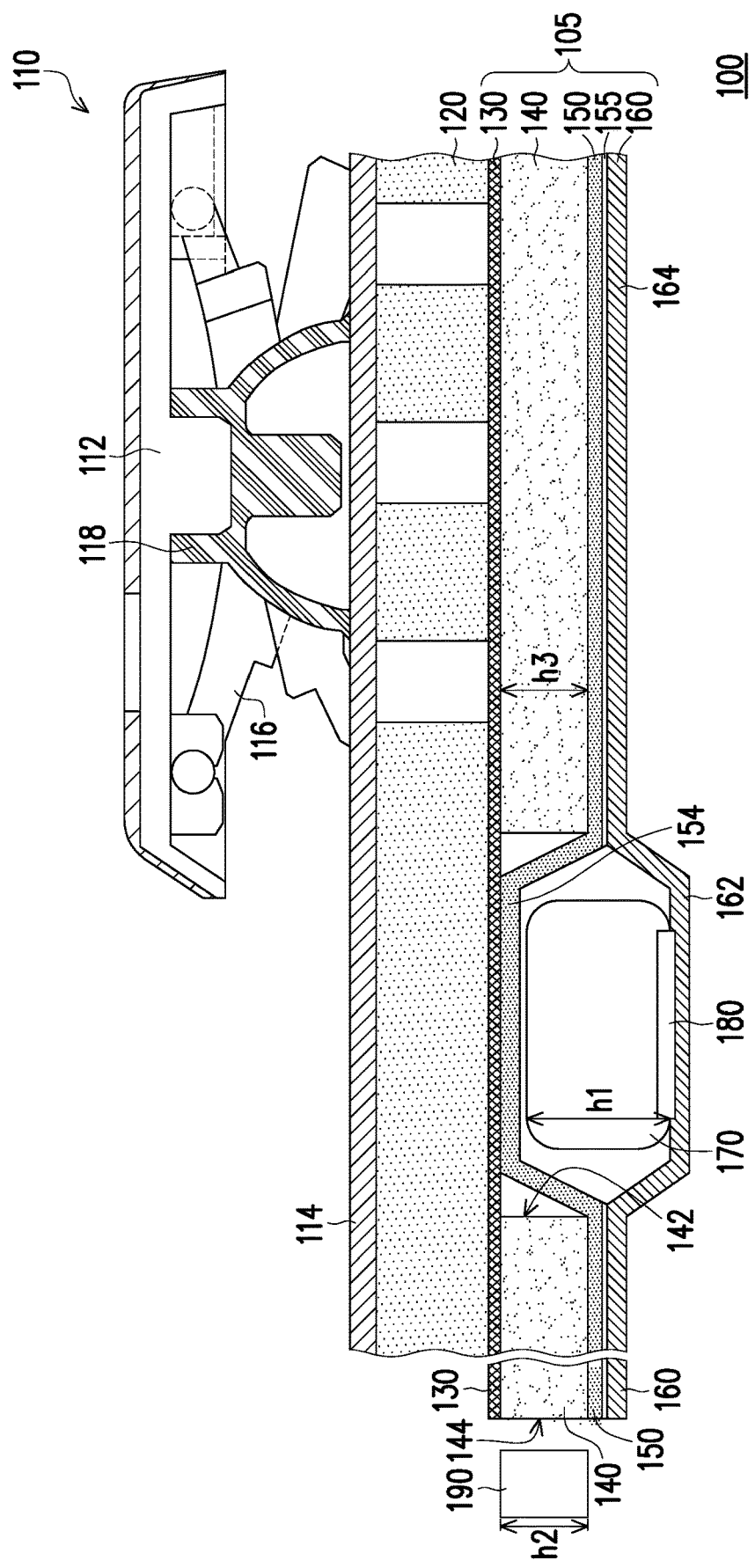
FIG. 3 is a schematic partial cross-sectional view of a luminous keyboard according to an embodiment of the disclosure.

FIG. 1 is a schematic top view of a luminous keyboard according to an embodiment of the present disclosure. FIG. 2 is a schematic bottom view of a luminous keyboard according to an embodiment of the present disclosure. FIG. 3 is a schematic partial cross-sectional view of a luminous keyboard according to an embodiment of the present disclosure. Referring to FIG. 1 to FIG. 3, in some embodiments, the luminous keyboard 100 includes a backlight module 105, a base plate 120, and a key switch structure 110. The backlight module 105 may include a light guide plate 140, a circuit board 160, an electronic component 170, a light-shielding sheet 130, a reflective sheet 150, and a light-emitting component 190. The circuit board 160 could be a flexible printed circuit (FPC), a printed circuit board (PCB), or any substrate with conductive patterns formed thereon. In some embodiments, the key switch structure 110 may include a functional layer 114 disposed on the base plate 120 and at least one keycap 112 disposed on the functional layer 114.

In this embodiment, the luminous keyboard 100 may be, for example, a membrane keyboard applicable for a notebook computer. Accordingly, the functional layer 114 may be a membrane circuit layer, and the key switch structure 110 may include a plurality of key caps 112. The key caps 112 may be disposed on the functional layer 114 for users to press and thereby execute the corresponding functions (e.g., Space, Caps Lock, Shift, Enter, Delete) of the pressed keycap 112 accordingly. In some embodiments, the luminous keyboard 100 may be coupled to a controller, such as a computer, a computer terminal, a console (e.g., video game console), or the like. The controller can execute a program or connect to a service provider, such as a server, network, or internet, to execute or provide the program to a device. In addition, the outermost surface of the luminous keyboard 100 may further have an identifier, such as barcodes, a two-dimensional codes (QR codes), three-dimensional codes, or other recognizable patterns, symbols, characters, and numerical codes. Specifically, the identifier can be placed on any surface of the keyboard, such as the base plate, a frame, the backlight module, a circuit board, and the identifier can be directly formed on the keyboard by the method chose from printing, spraying, laser engraving, polishing, stamping, attaching. The identifier may include information such as the production history of the keyboard product; that is, the related production and manufacturing data of the keyboard body, or its base plate, frame, backlight module, circuit board, or the like, can be recorded in the identifier. For example, the related manufacturing data may include manufacturing date, manufacturing location, manufacturing batch number, product lot number, product type, material information, test record, etc. The above-mentioned manufacturing data can be used for identification, tracking or follow-up statistical analysis of the keyboard or its base plate, frame, backlight module, circuit board. If a problem or defect occurs in the keyboard or its base plate, frame, backlight module, circuit board that may need to be reworked or repaired, the defect or problem can be clarified and the batch related to non-conforming parts can be tracked by the manufacturing data recorded in the identifier. As shown in FIG. 2, in this embodiment, the identifier 101 of the luminous keyboard 100 may be disposed on the outermost surface of the backlight module 105, such as the surface of the reflective sheet 150 away from the light guide plate 140. However, in other embodiments, the identifier 101 may also be disposed on the bottom surface of the base plate 120, such as the surface of the base plate 120 adjacent to the backlight module 105, as long as the identifier 101 is exposed for identification.

In some embodiments, the key switch structure 110 may further include a lifting mechanism 116 and a restoring component 118 between the base plate 120 and the keycap 112. One end of the lifting mechanism 116 is movably connected to the key cap 112, and the other end thereof is movably connected to the base plate 120. The keycap 112 can be disposed on the lifting mechanism 116. The lifting mechanism 116 is configured to support the keycap 112 for vertical movement relative to the membrane switch of the functional layer 114. In other words, the keycap 112 can move relative to the base plate 120 via the lifting mechanism 116 between the pressed position and the unpressed position. In some embodiments, the membrane switch may include an upper membrane circuit and a lower membrane circuit. The restoring component 118 may be disposed on the upper membrane circuit. With such configuration, an external force can be applied to the keycap 112 to move the keycap 112 toward the upper membrane circuit. The restoring component 118 deforms according to the movement of the key cap 112, so as to make the upper membrane circuit deformed toward the lower membrane circuit, thereby turning on the membrane switch. In the embodiment shown in FIG. 3, the lifting mechanism 116 is a scissors-type lifting mechanism, and the restoring component 118 may be an elastic dome, e.g., rubber dome or metal dome. In other embodiments, the lifting mechanism 116 may also be a wing-type lifting mechanism, and the restoring component 118 may be a spring or elastic sheet. In other embodiments, the restoring component 118 may also be a magnetic component, and therefore the key switch structure 100 of the present embodiment may be a magnetic key.

The base plate 120 is disposed under the key switch structure 110 to provide mechanical support to the key switch structure 110. Herein, the base plate 120 may be a metal plate (such as a stainless steel plate, a galvanized steel plate, an aluminum plate, or an aluminum-magnesium alloy plate) or a non-metallic plate (such as a plastic plate, a carbon fiber plate, or a glass fiber plate). In an embodiment, the base plate 120 may also be a composite plate formed by joining different materials together, such as a metal and non-metal composite plate. The metal could be pre-treated with a surface treatment to improve activity and binding force, and then integrally bonded with the non-metallic material through injection molding. In addition, the thickness of the base plate 120 is, for example, between 0.1 mm and 0.6 mm according to the characteristics of the selected material. For example, a metal plate is relatively rigid, and its thickness can be about 0.1 mm to 0.3 mm as the base plate 120, but a non-metallic plate is lighter in weight or softer in material, and its thickness can be substantially greater than the thickness of the metal plate as the base plate 120.

Figure 4:
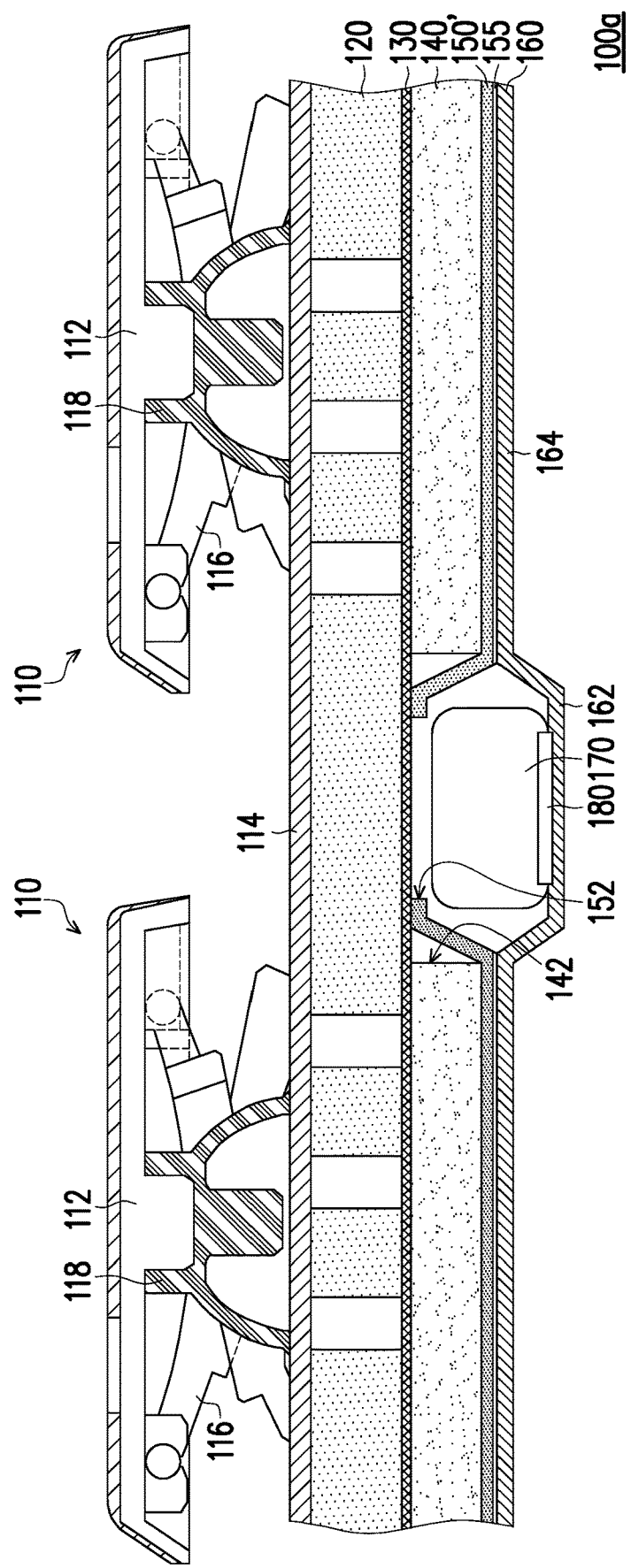
FIG. 4 is a schematic partial cross-sectional view of a luminous keyboard according to an embodiment of the present disclosure.

In some embodiments, the light-emitting component 190 may be a light-emitting diode (LED) or an organic light-emitting diode (OLED), which is configured to emit light. In some embodiments, the light-emitting component 190 is disposed on the light guide plate 140 so that light enters the light guide plate 140. In an implemented embodiment, the light-emitting component 190 may be disposed on the circuit board 160 and may be disposed adjacent to the side surface 144 of the light guide plate 140. In this configuration, light emitted by the light-emitting component 190 may enter the light guide plate 140 from the side surface 144. In another embodiment, the light guide plate 140 may further have a light-source opening extending to the interior of the light guide plate 140. Each light-source opening may have its own light incident surface. Each light-emitting component 190 may be disposed in the corresponding light-source opening. In this configuration, the light emitted by the light-emitting component 190 can enter the light guide plate 140 from the light incident surface of the corresponding light-source opening. The side surface 144 can be regarded as an inner side surface (inner wall) of the light-source opening, and the light emitted by the light-emitting component 190 may enter the light guide plate 140 from the inner side surface 144 of the light-source opening. In other embodiments, the light-emitting component 190 may be disposed on the light-shielding sheet 130 or on the functional layer 114 of the key switch structure 110. Thus, the light-emitting component 190 extends downward to be immediately adjacent to the side surface 144 of the light guide plate 140 or arranged in the corresponding light-source opening of the light guide plate 140. In other embodiments, the light-emitting component 190 may be disposed on the reflective sheet 150, so that the light-emitting component 190 may extend upward to be immediately adjacent to the side surface 144 of the light guide plate 140 or arranged in the corresponding light-source opening of the light guide plate 140. The embodiment does not limit the configuration of the light-emitting component 190. In some embodiments, a plurality of light-emitting components 190 may be integrated on the light-emitting circuit board to form an integral light source unit, thereby improving assembling efficiency. In FIG. 4 to FIG.

7, the light-emitting component is not illustrated, but a light-emitting component could be disposed on the side surface 144 of the light guide plate 140 or the inner side surface 144 of the light-source opening in the light guide plate 140 as the light-emitting component 190 in FIG. 3. The base plate 120 may include a plurality of openings, which may be positioned under the key cap 112 to facilitate light emission.

In some embodiments, the light guide plate 140 may be made of acrylic, silicone, thermoplastic polyurethane (TPU), or other suitable light guide polymer materials. The thickness of the light guide plate 140 may be determined according to requirements. The light guide plate 140 may include an escape opening 142. The circuit board 160 is disposed under the light guide plate 140. The electronic component 170 is disposed on the circuit board 160, and at least part of the electronic component 170 is located in the escape opening 142. In this configuration, by embedding at least a part of the electronic component 170 in the escape opening 142 of the light guide plate 140, the thickness of the luminous keyboard 100 can be effectively reduced. The electronic component 170 different from the light-emitting component 190 could be an active component or a passive component, such as a MOS device, a driver IC, or a connector, etc., and the electronic component 170 may be electrically connected to the circuit board 160 through, for example, a solder 180. As shown in FIG. 3, the height h1 of the electronic component 170 may be greater than the height h2 of the light-emitting component 190. For example, when the light-emitting component 190 is located on the side surface 144 of the light guide plate 140 or in the corresponding light-source opening, the height h2 of the light-emitting component 190 is less than or equal to the thickness h3 of the light guide plate 140 (that is, the top surface of the light-emitting component 190 does not protrude from the surface of the light guide plate 140), and the height h1 of the electronic component 170 embedded in the escape opening 142 may be greater than or equal to the thickness h3 of the light guide plate 140 (i.e., the top surface of the electronic component 170 may protrude from the surface of the light guide plate 140).

The reflective sheet 150 may be disposed on the rear surface of the light guide plate 140 and located between the light guide plate 140 and the circuit board 160, and the reflective sheet 150 extends into the escape opening 142. In some embodiments, the reflective sheet 150 disposed on the rear surface of the light guide plate 140 may be configured to reflect the light leaking from the bottom of the light guide plate 140, so as to increase the exaction efficiency of the light from the backlight module. The base plate 120 may be disposed on the light guide plate 140, and the key switch structure 110 is disposed on the base plate 120. In some embodiments, the position of the escape opening 142 may partially overlap with the position of the key cap 112 from a top view. In other embodiments, the position of the escape opening 142 may not overlap with the position of the key cap 112. In an implemented embodiment (such as the embodiment shown in FIG. 4), the position of the escape opening 142 (that is, the position where the electronic component 170 is disposed) can be located between two adjacent keycaps 112 to avoid shadowing or interfering the light provided to the keycap 112. The reflective sheet 150 may be a reflective film formed by a reflective material (such as a metal foil), or a non-reflective film coated with a reflective material, or a plastic film doped with reflective particles (such as a PET film doped with reflective particles).

The shape and size of the reflective sheet 150 may correspond to the light guide plate 140.

In this embodiment, the reflective sheet 150 may extend upward from the rear surface of the light guide plate 140 into the escape opening 142 and include a cover portion 154 for covering the upper surface of the electronic component 170. Accordingly, the light emitted by the light-emitting component 190 does not escape from the escape opening 142. In some embodiments, the backlight module 105 further includes a light-shielding sheet 130, which is disposed on the light-emitting surface of the light guide plate 140 opposite to the rear surface. The light-shielding sheet 130 and the reflective sheet 150 are respectively disposed on two opposite sides of the light guide plate 140. The light-shielding sheet 130 may be located between the light guide plate 140 and the base plate 120. In the present embodiment, the light-shielding sheet 130 covers the cover portion 154 of the reflective sheet 150. In some embodiments, the reflective sheet 150 may be connected to the light-shielding sheet 130 at a portion corresponding to an upper surface of the electronic component 190 (for example, the cover portion 154). In some embodiments, the light-shielding sheet 130 has a light-shielding pattern to selectively block the light or allow the light to pass through.

In some embodiments, the light-shielding sheet 130 is a light transmissive optical film, such as polyethylene terephthalate (PET), and has a pattern design on the film to shield the corresponding portion of the luminous keyboard 100 that does not need to be illuminated. In one embodiment, the shape and size of the light-shielding sheet 130 may correspond to the light guide plate 120. The reflective sheet 150 is disposed on the other side of the light guide plate 140 opposite to the light-shielding sheet 130, and is configured to reflect light leaking from the rear side of the light guide plate 140 back to the light guide plate 140.

The circuit board 160 may include the bonding portion 164 disposed on the rear surface of the light guide plate 142 and the component portion 162 corresponding to the escape opening 142, and the electronic component 170 is disposed on the component portion 162. In addition, the component portion 162 may slightly protrude from the bonding portion 164 in a direction away from the light guide plate 140. In some embodiments, the backlight module 105 may further include an adhesive layer 155 disposed between the reflective sheet 150 and the circuit board 160. The adhesive layer 155 is opaque, for example. Specifically, the adhesive layer 155 may be disposed on a portion where the reflective sheet 150 and the circuit board 160 are bonded to each other. In such a configuration, the reflective sheet 150 and the circuit board 160 may be bonded through the adhesive layer 155, so that the electronic component 170 is disposed in the escape opening 142. In addition, the step difference between the bonding portion 164 and the component portion 162 can be reduced by applying the adhesive layer 155 at the bonding portion 164. In other embodiments, the component portion 162 of the circuit board 160 may be coplanar with the bonding portion 164. Namely, the bottom surface of the component portion 162 is, for example, generally aligned with the bottom surface of the bonding portion 164. In other words, the electronic component 170 can be completely embedded in the light guide plate 140 so that the circuit board 160 underneath is flat. Under such a configuration, by embedding at least a part of the electronic component 170 in the escape opening 142 of the light guide plate 140, the thickness of the luminous keyboard 100 can be effectively reduced. In addition, the reflective sheet 150 of this embodiment extends upward from the rear surface of the light guide plate 140 into the escape opening 142 and covers the upper surface of the electronic component 170, thus ensuring that the light emitted by the light-emitting component 190 would not leak from the escape opening 142.

It is noted that the adhesive layer 155 could be applied to compensate the difference in height between the light guide plate 140 and the light-emitting component 190 when the thickness h3 of the light guide plate 140 is less than the height h2 of the light-emitting component 190. In this embodiment, the light-emitting component 190 and the electronic component 170 of different heights are disposed on and coupled to the circuit board 160 respectively. As the thickness h3 of the light guide plate 140 is less than the height h2 of the light-emitting component 190, the light-emitting component 190 adjacent to the side surface 144 of the light guide plate 140 may protrude from the light guide plate 140. The adhesive layer 155 between the reflective sheet 150 and the circuit board 160 is not arranged at a position corresponding to the light-emitting component 190, thereby enabling the bottom surface of the circuit board 160 to be flat. The thickness of the adhesive layer 155 is, for example, less than the thickness h3 of the light guide plate 140, but could be approximated to the number by subtracting the thickness h3 of the light guide plate 140 and the thickness of the reflective sheet 150 from the height h2 of the light-emitting component 190.

FIG. 4 is a schematic partial cross-sectional view of a luminous keyboard according to an embodiment of the present disclosure. It is noted that the luminous keyboard 100a of the present embodiment contains many features same as or similar to the luminous keyboard 100 disclosed earlier with FIG. 3. For purpose of clarity and simplicity, detail description of same or similar features may be omitted, and the same or similar reference numbers denote the same or like components. The main differences between the luminous keyboard 100a of the present embodiment and the luminous keyboard 100 of FIG. 3 are described as follows.

Referring to FIG. 4, in some embodiments, the reflective sheet 150' may extend upward from the rear surface of the light guide plate 140 into the escape opening 142. In the present embodiment, the reflective sheet 150' includes the reflective sheet opening 152, which is configured to expose the upper surface of the electronic component 170. The light-shielding sheet 130 is configured to cover the electronic component 170 exposed by the reflective sheet 150'. Accordingly, at least a part of the electronic component 170 can be located in the escape opening 142 and the reflective sheet opening 152. That is to say, the position of the electronic component 170 can be further shifted (upward) toward the key switch structure 110. With such configuration, the thickness of the luminous keyboard 100 can be further reduced. Moreover, since the reflective sheet 150' still extends upward to cover the inner wall of the escape opening 142 and is bonded with the light-shielding sheet 130 above, in some embodiments, the reflective sheet 150' may further partially extend to the upper side of the escape opening 142 along the light-shielding sheet 130. Thereby, the reflective sheet 150' of this embodiment may still prevent the light emitted by the light-emitting component 190 from leaking out of the escape opening 142.

Figure 5:
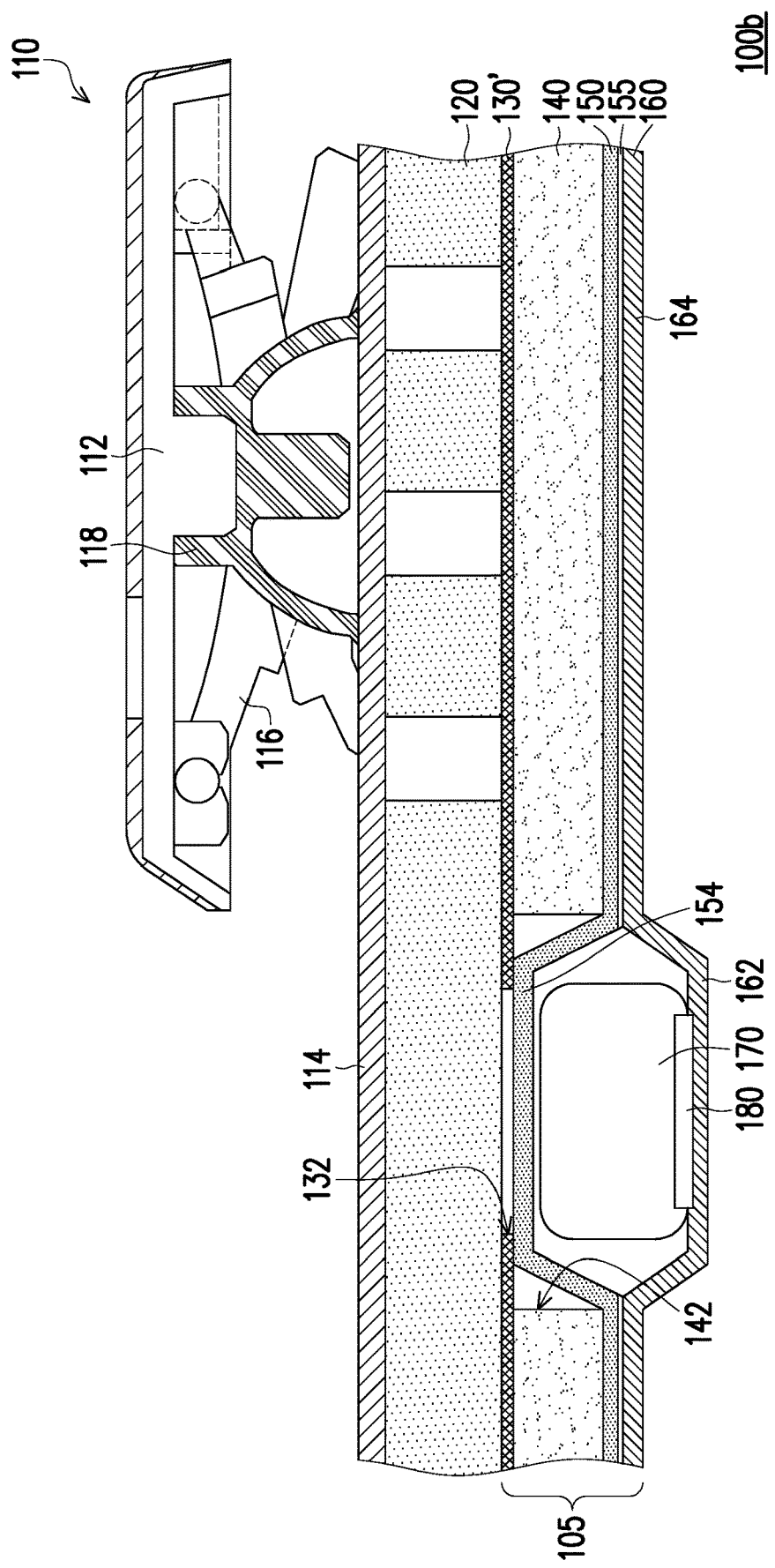
FIG. 5 is a schematic partial cross-sectional view of a luminous keyboard according to an embodiment of the disclosure.

FIG. 5 is a schematic partial cross-sectional view of a luminous keyboard according to an embodiment of the present disclosure. It is noted that the luminous keyboard 100b of the present embodiment contains many features same as or similar to the luminous keyboard 100 disclosed earlier with FIG. 3. For purpose of clarity and simplicity, detail description of same or similar features may be omitted, and the same or similar reference numbers denote the same or like components. The main differences between the luminous keyboard 100b of the present embodiment and the luminous keyboard 100 of FIG. 3 are described as follows.

Referring to FIG. 5, in some embodiments, the reflective sheet 150 may extend upward from the rear surface of the light guide plate 140 into the escape opening 142 and include a cover portion 154 for covering the upper surface of the electronic component 170. In this way, it can be ensured that the light emitted by the light-emitting component 190 does not escape from the escape opening 142. In this embodiment, the light-shielding sheet 130' is disposed on the light-emitting surface of the light guide plate 140 opposite to the rear surface, and the light-shielding sheet 130' includes a light-shielding sheet opening 132 configured to expose the cover portion 154 of the reflective sheet 150. With such configuration, the reflective sheet 150 covers the upper surface of the electronic component 170 to ensure that the light emitted by the light-emitting component 190 does not leak from the escape opening 142. Moreover, the light-shielding sheet 130' includes a light-shielding sheet opening 132 corresponding to the escape opening 142, so the thickness of the sheets above the electronic component 170 can still be reduced, so that the configuring position of the electronic component 170 may still be shifted (upward) toward the key switch structure 110, so that the thickness of the luminous keyboard 100 can be further reduced.

Figure 6:
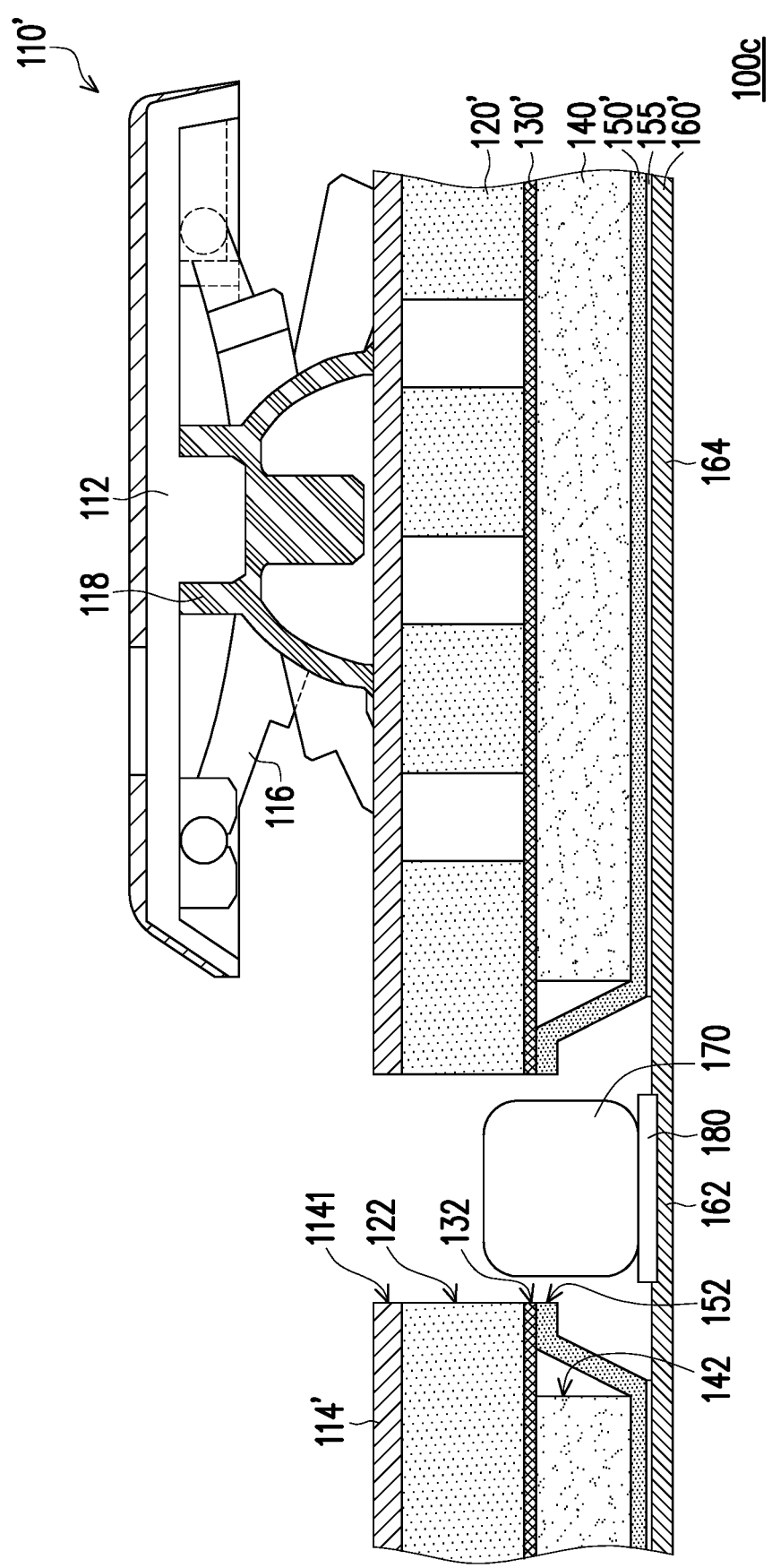
FIG. 6 is a schematic partial cross-sectional view of a luminous keyboard according to an embodiment of the disclosure.

FIG. 6 is a schematic partial cross-sectional view of a luminous keyboard according to an embodiment of the present disclosure. It is noted that the luminous keyboard 100c of the present embodiment contains many features same as or similar to the luminous keyboard 100 disclosed earlier with FIG. 3. For purpose of clarity and simplicity, detail description of same or similar features may be omitted, and the same or similar reference numbers denote the same or like components. The main differences between the luminous keyboard 100c of the present embodiment and the luminous keyboard 100 of FIG. 3 are described as follows.

Referring to FIG. 6, in some embodiments, the reflective sheet 150 may extend upward from the rear surface of the light guide plate 140 into the escape opening 142. Moreover, in the present embodiment, the reflective sheet 150' includes a reflective sheet opening 152, which is configured to expose the upper surface of the electronic component 170. Similarly, the light-shielding sheet 130' includes a light-shielding sheet opening 132, which corresponds to the escape opening 142 and the reflective sheet opening 152, and is configured to expose the upper surface of the electronic component 170. In the present embodiment, the base plate 120' may include a base plate opening 122 exposing the electronic component 170. Moreover, the functional layer 114' may also correspondingly include a functional layer opening 1141 that exposes the electronic component 170. In other words, the escape opening 142, the reflective sheet opening 152, the light-shielding opening 132, the base plate opening 122, and the functional layer opening 1141 may jointly expose the electronic component 170 disposed on the circuit board 160'. In some embodiments, the escape opening 142, the reflective sheet opening 152, the light-shielding opening 132, the base plate opening 122, and the functional layer opening 1141 may correspond (align) with one another to jointly expose the electronic component 170 underneath. In some embodiments, the size (diameter) of the escape opening 142 may be slightly larger than the sizes (diameters) of the reflective sheet opening 152, the light-shielding opening 132, the base plate opening 122, and the functional layer opening 1141, such that the reflective sheet 150' may extend upward to cover the inner wall of the escape opening 142 and is bonded to the light-shielding sheet 130 above. The reflective sheet 150' may further partially extend to the upper side of the escape opening 142 along the light-shielding sheet 130. Therefore, the reflective sheet 150' of this embodiment can still prevent the light emitted by the light-emitting component 190 from leaking out of the escape opening 142. In some embodiments, the locations of the escape opening 142, the reflective sheet opening 152, the light-shielding sheet opening 132, the base plate opening 122, and the functional layer opening 1141 may be staggered from the locations of the key cap 112, the lifting mechanism 116, and the restoring component 118. In the present embodiment, the central axis of the escape opening 142 does not overlap with the central axis of the key cap 112 from a top view. In this way, at least a part of the electronic component 170 can be accommodated in a component disposing space jointly formed by the escape opening 142, the reflective sheet opening 152, the light-shielding sheet opening 132, the base plate opening 122, and the functional layer opening 1141. That is to say, the position of the electronic component 170 can be further shifted (upward) toward the key switch structure 110. In such configuration, the thickness of the luminous keyboard 100 can be further reduced. In the present embodiment, the component portion 162 of the circuit board 160 may be coplanar with the bonding portion 164. In other words, the electronic component 170 can be completely embedded in the component disposing space jointly formed by the escape opening 142, the reflective sheet opening 152, the light-shielding opening 132, the base plate opening 122, and the functional layer opening 1141, so that the circuit board 160 underneath is flat. In other embodiments, the component portion 162 of the circuit board 160 may slightly protrude from the bonding portion 164 in a direction away from the light guide plate 140.

Figure 7:
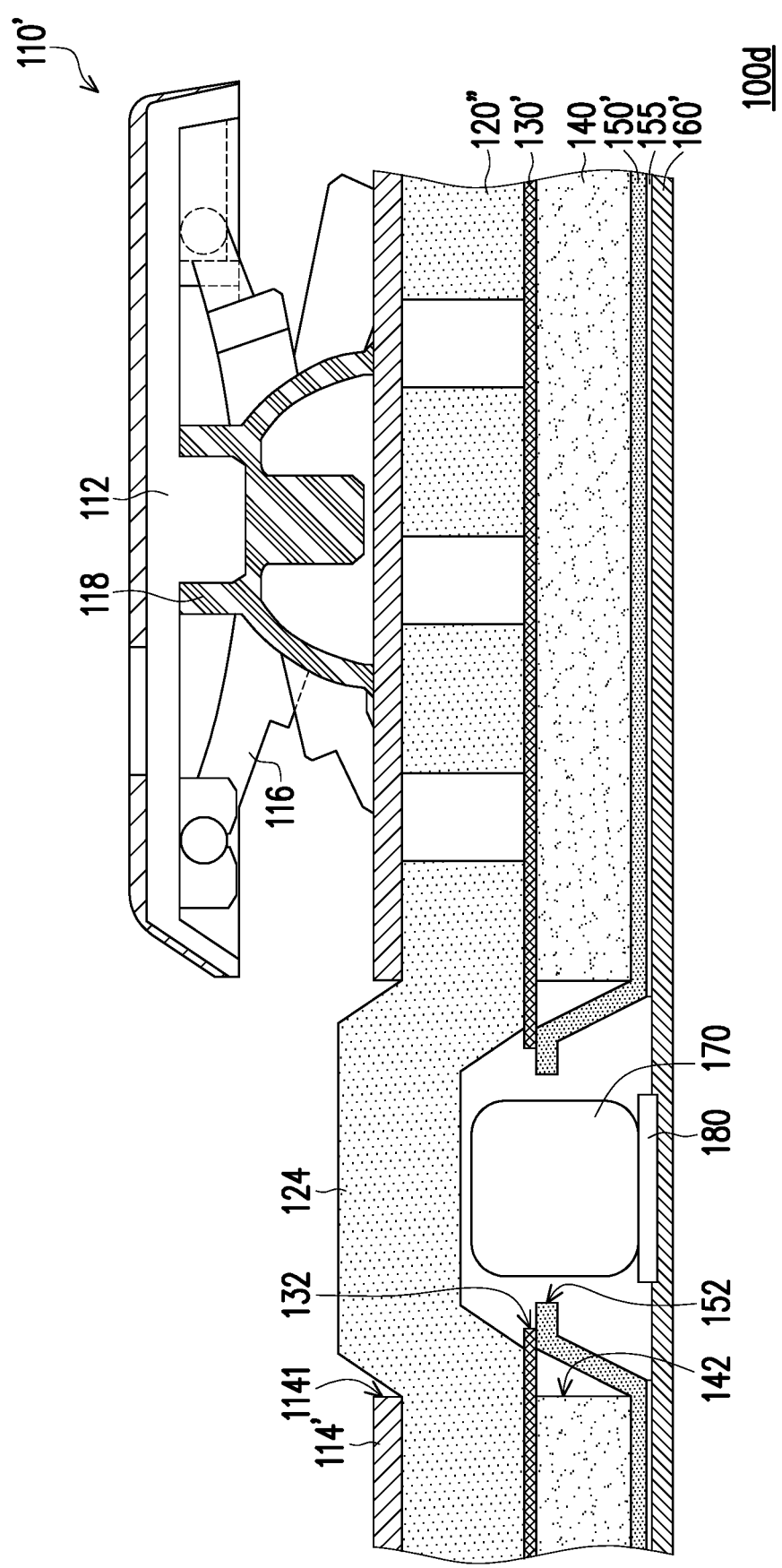
FIG. 7 is a schematic partial cross-sectional view of a luminous keyboard according to an embodiment of the present disclosure.

FIG. 7 is a schematic partial cross-sectional view of a luminous keyboard according to an embodiment of the present disclosure. It is noted that the luminous keyboard 100d of the present embodiment contains many features same as or similar to the luminous keyboard 100c disclosed earlier with FIG. 6. For purpose of clarity and simplicity, detail description of same or similar features may be omitted, and the same or similar reference numbers denote the same or like components. The main differences between the luminous keyboard 100d of the present embodiment and the luminous keyboard 100c of FIG. 6 are described as follows.

Referring to FIG. 7, in some embodiments, the reflective sheet 150 may extend upward from the rear surface of the light guide plate 140 into the escape opening 142. Moreover, in the present embodiment, the reflective sheet 150' includes the reflective sheet opening 152, which is configured to expose the upper surface of the electronic component 170. Similarly, the light-shielding sheet 130' includes a light-shielding sheet opening 132, which corresponds to the escape opening 142 and the reflective sheet opening 152, and is configured to expose the upper surface of the electronic component 170. In this embodiment, the functional layer 114' may include a functional layer opening 1141 corresponding to the escape opening 142 (or corresponding to the electronic component 170). The base plate 120" includes a protruding portion 124 protruding from the functional layer opening 1141 toward the functional layer. In other words, the protruding portion 124 may protrude away from the circuit board 160. In some embodiments, the base plate 120" may be formed with the protruding portion 124 by stamping or other suitable methods. In this configuration, at least a part of the electronic component 170 is located in the component disposing space jointly formed by the escape opening 142, the reflective sheet opening 152, and the protruding portion 124. That is to say, the location of the electronic component 170 can be further shifted (upward) toward the key switch structure 110. With such configuration, the thickness of the luminous keyboard 100 can be further reduced. In this embodiment, the component portion 162 of the circuit board 160 may be coplanar with the bonding portion 164. In other words, the electronic component 170 can be completely embedded in the component disposing space jointly formed by the escape opening 142, the reflective sheet opening 152, and the protruding portion 124, so that the circuit board 160 underneath is flat. In other embodiments, the component portion 162 of the circuit board 160 may slightly protrude from the bonding portion 164 in a direction away from the light guide plate 140.

In some embodiments, the size (diameter) of the escape opening 142 may be slightly larger than the sizes (diameters) of the reflective sheet opening 152 and the light-shielding sheet opening 132, so that the reflective sheet 150' may extend upward to cover the inner wall of the escape opening 142, and is bonded to the light-shielding sheet 130 above. The reflective sheet 150' can further partially extend to the upper side of the escape opening 142 along the light-shielding sheet 130. Therefore, the reflective sheet 150' in this embodiment can still prevent the light emitted by the light-emitting component 190 from leaking out of the escape opening 142. In some embodiments, the locations of the escape opening 142, the reflective sheet opening 152, the light-shielding opening 132, the protruding portion 124 of the base plate 120", and the functional layer opening 1141 may be staggered from the locations of the key cap 112, the lifting mechanism 116, and the restoring component 118. In the present embodiment, the central axis of the escape opening 142 does not overlap with the central axis of the key cap 112 from a top view.

In sum, in the embodiments of the disclosure, the light guide plate of the backlight module has an escape opening, and the reflective sheet extends upward from the rear surface of the light guide plate into the escape opening. With such configuration, at least a part of the electronic component can be embedded in the escape opening of the light guide plate, so that the thickness of the luminous keyboard using such backlight module can be effectively reduced. In addition, in the embodiments of the disclosure, the reflective sheet extends upward from the rear surface of the light guide plate to cover the inner wall of the escape opening, thus effectively preventing the light emitted by the light-emitting component from leaking out of the escape opening.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A backlight module, comprising:
a light guide plate comprising an escape opening and a light-source opening;
a circuit board disposed under the light guide plate;
an electronic component electrically connected to the circuit board, and at least a part of the electronic component being located in the escape opening;
a reflective layer disposed on a rear surface of the light guide plate and located between the light guide plate and the circuit board, wherein the reflective layer comprises a reflective layer opening corresponding to the escape opening and exposing a surface of the electronic component;
a light-shielding layer disposed on a light-emitting surface of the light guide plate opposite to the rear surface, wherein the light-shielding layer covers the electronic component exposed by the reflective layer; and
a light-emitting component disposed in the light-source opening.

2. The backlight module according to claim 1, wherein the electronic component is different from the light-emitting component, and a height of the electronic component is different from a height of the light-emitting component.

3. The backlight module according to claim 1, wherein the light-emitting component corresponding to a surface of the light guide plate is disposed on the circuit board or the reflective layer or the light-shielding layer.

4. The backlight module according to claim 1, wherein the reflective layer is connected to the light-shielding layer at a portion corresponding to a surface of the electronic component.

5. The backlight module according to claim 1, wherein the circuit board includes a bonding portion disposed on the rear surface of the light guide plate and a component portion corresponding to the escape opening, and the component portion coupled to the electronic component protrudes from the bonding portion in a direction away from the light guide plate.

6. The backlight module according to claim 1, wherein the circuit board includes a bonding portion disposed on the rear surface of the light guide plate and a component portion corresponding to the escape opening, and the component portion coupled to the electronic component is coplanar with the bonding portion.

7. The backlight module according to claim 1, wherein the light-shielding layer has a light-shielding pattern to selectively allow light to pass through.

8. The backlight module according to claim 1, wherein a surface of the reflective layer away from the light guide plate is provided with an identifier.

9. A luminous keyboard, comprising:
a light guide plate comprising an escape opening and a light-source opening;
a circuit board disposed under the light guide plate;
an electronic component disposed on the circuit board, and at least a part of the electronic component being located in the escape opening;
a reflective layer disposed on a rear surface of the light guide plate, wherein the reflective layer comprises a reflective layer opening corresponding to the escape opening;
a light-emitting component disposed in the light-source opening;
a base plate disposed on the light guide plate, wherein the base plate and the circuit board are disposed on two opposite sides of the light guide plate; and
a plurality of keycaps disposed on the base plate, wherein the electronic component is disposed corresponding to a position between two adjacent keycaps.

10. The luminous keyboard according to claim 9, wherein the reflective layer extends upward into the escape opening and has at least a portion covering a surface of the electronic component.

11. The luminous keyboard according to claim 9, further comprising a light-shielding layer disposed on a light-emitting surface of the light guide plate opposite to the rear surface, wherein the light-shielding layer covers the electronic component.

12. The luminous keyboard according to claim 9, further comprising a light-shielding layer disposed on a light-emitting surface of the light guide plate opposite to the rear surface, wherein the light-shielding layer comprises a light-shielding layer opening exposing the electronic component.

13. The luminous keyboard according to claim 9, wherein the base plate comprises a base plate opening or a protruding portion corresponding to the electronic component, the protruding portion protruding away from the circuit board, and a height of the electronic component is substantially greater than a height of the light-emitting component.

14. The luminous keyboard according to claim 9, wherein a surface of the electronic component is exposed by the reflective layer opening.

15. The luminous keyboard according to claim 9, wherein a key switch structure comprises a restoring component disposed between the base plate and a corresponding keycap, and the electronic component is positioned outside the restoring component.

16. A luminous keyboard, comprising:
a key switch structure;
a light guide plate being disposed under the key switch structure and comprising an escape opening;
a circuit board disposed under the light guide plate;
an electronic component coupled to the circuit board, and at least a part of the electronic component being located in the escape opening;
a light-emitting component coupled to the circuit board and disposed on a surface of the light guide plate; and
a light-shielding layer disposed between the key switch structure and the light guide plate, wherein the light-shielding layer covers a surface of the electronic component.

17. The luminous keyboard according to claim 16, further comprising a reflective layer disposed under the light guide plate, wherein the reflective layer comprises a reflective layer opening corresponding to the escape opening.

18. The luminous keyboard according to claim 17, further comprising an opaque adhesive layer disposed between the reflective layer and the circuit board.

19. The luminous keyboard according to claim 16, wherein the light-emitting component and the electronic component disposed on a same side of the circuit board are of different heights.

20. The luminous keyboard according to claim 16, wherein the key switch structure comprises:
a base plate;
a keycap disposed on the base plate; and
a restoring component between the base plate and the keycap, wherein the electronic component is positioned outside the restoring component.

* * * * *